United States Patent
Peschansky et al.

(10) Patent No.: US 8,371,602 B1
(45) Date of Patent: Feb. 12, 2013

(54) COLLAPSIBLE VEHICLE TOW LOOP

(75) Inventors: Len V. Peschansky, West Bloomfield, MI (US); David L Von Knorring, Lapeer, MI (US); Zhenkang Li, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/549,504

(22) Filed: Jul. 15, 2012

(51) Int. Cl.
*B60D 1/04* (2006.01)
(52) U.S. Cl. ............... 280/495; 280/446.1; 280/449
(58) Field of Classification Search ........... 280/446.1, 280/449, 450, 451, 453, 489, 495, 505; D12/162, D12/420
See application file for complete search history.

(56) References Cited

U.S. PATENT DOCUMENTS

| | | | | |
|---|---|---|---|---|
| 2,959,427 A * | 11/1960 | Keese | ............ | 280/405.1 |
| 6,382,654 B1 * | 5/2002 | Mahncke | ............ | 280/491.1 |
| 7,222,873 B2 * | 5/2007 | Rodgers | ............ | 280/495 |
| 7,290,783 B2 * | 11/2007 | Dornbos | ............ | 280/495 |
| 7,753,396 B2 * | 7/2010 | Jamieson et al. | ............ | 280/498 |
| 7,775,546 B2 | 8/2010 | Asjad | | |
| 8,246,069 B2 * | 8/2012 | Ladzinski et al. | ............ | 280/495 |

* cited by examiner

*Primary Examiner* — Tony Winner

(57) ABSTRACT

A collapsible tow hook for a motor vehicle includes a bracket attached to a vehicle structure and having laterally spaced side walls with first and second slots in each of the side walls. A tow loop has laterally spaced arms that straddle the spaced side walls of the bracket. First and second bolts extend through bolt holes in the laterally spaced arms and through the slots of the side walls. A retainer acts between the bracket and the first and second bolts to establish a normal upward position of the tow loop on the vehicle. The retainer yields to allow the first and second bolts to traverse the slots upon the imposition of a load on the tow loop in a direction opposite to the towing direction so that the tow loop is pivoted to a collapsed position relative to the vehicle structure.

18 Claims, 3 Drawing Sheets

COLLAPSIBLE VEHICLE TOW LOOP

FIELD OF THE INVENTION

The present invention relates to a tow hook mounted on a vehicle and more particularly a tow hook having high strength under loads imposed in one direction during towing but being yieldable and collapsible under loads imposed in the direction opposite to the towing direction.

BACKGROUND OF THE INVENTION

Many motor vehicles, particularly trucks, have one or more tow hooks attached to the bumper or to the frame rail, or other vehicle structure. The tow hooks permit a wrecker, a tow truck, or a tow tractor to be readily connected to the vehicle via a chain or a cable. A typical tow hook is a heavy duty ring or loop of metal, and the ring or loop is attached to the vehicle structure. The tow hook may be mounted on the front of the vehicle or on the rear of the vehicle.

Modern vehicles must comply with governmental regulations that define the crush performance of the vehicle under impact against a barrier. In some cases, the presence of the tow hook may alter the crush performance of the vehicle, and accordingly the vehicle structure surrounding the tow hook must be designed to offset the affect of the tow hook.

It would be desirable to provide a new and improved tow hook for vehicles that would be of high strength and reliability for towing and yet have little influence on the compliance with governmental regulations pertaining to vehicle barrier performance.

SUMMARY OF THE INVENTION

A collapsible tow hook for a motor vehicle includes a bracket attached to a vehicle structure and having laterally spaced side walls with first and second slots in each of the side walls. A tow loop has laterally spaced arms that straddle the spaced side walls of the bracket. First and second bolts extend through bolt holes in the laterally spaced arms and through the slots of the side walls. A retainer acts between the bracket and the first and second bolts to establish a normal upward position of the tow loop on the vehicle. The retainer yields to allow the first and second bolts to traverse the slots upon the imposition of a load on the tow loop in a direction opposite to the towing direction so that the tow loop is pivoted to a collapsed position relative to the vehicle structure.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is merely exemplary in nature and is not intended to limit the invention, its application, or uses.

Figure 1:
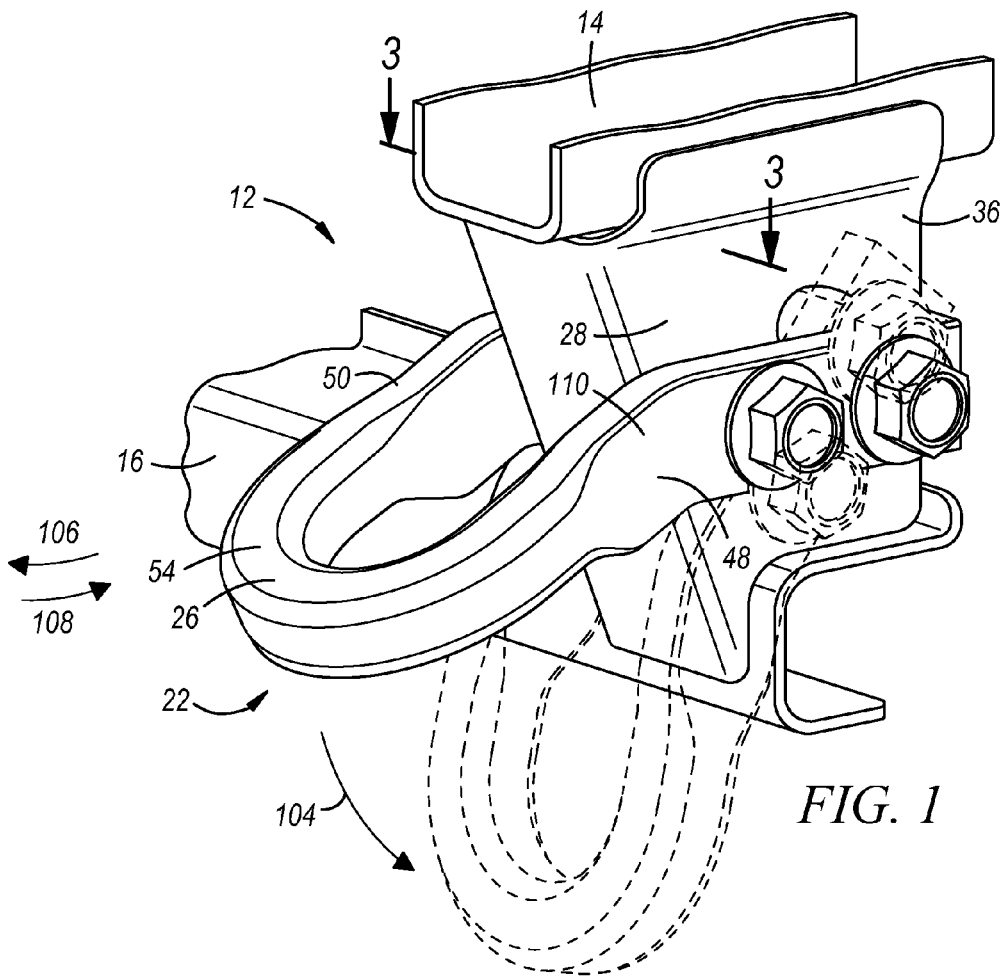
FIG. 1 is a perspective view of a motor vehicle front end having a tow hook mounted on the vehicle structure at the front of the vehicle.

Referring to FIG. 1, a motor vehicle 10 has a front end structure 12 including a frame rail 14 extending longitudinally of the vehicle and front cross member 16. A tow hook assembly 22 is attached to the frame rail 14 and the front cross member 16. A similar tow hook assembly, not shown, is provided on the other frame rail of the vehicle, not shown.

Figure 2:
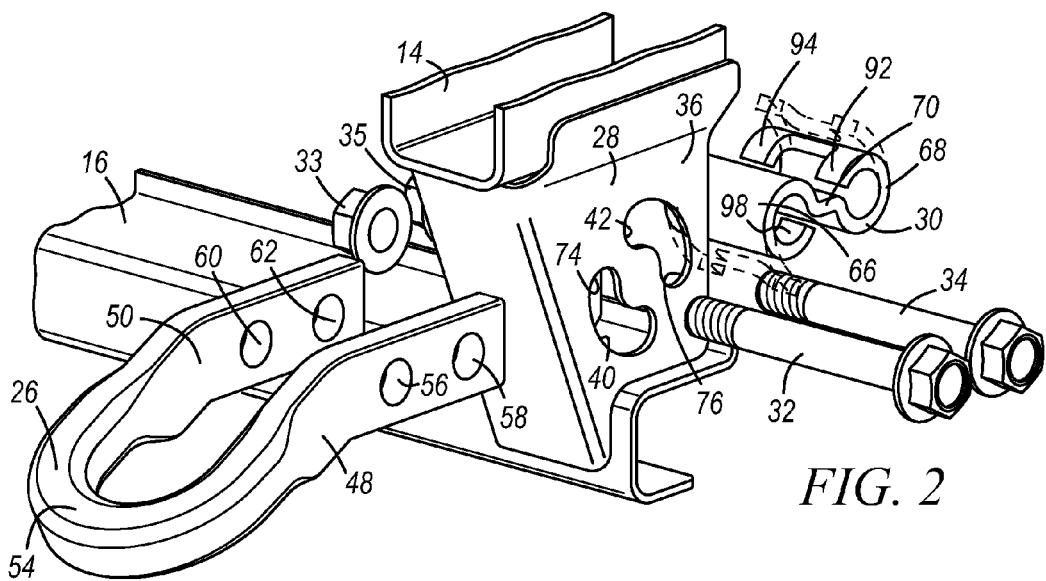
FIG. 2 is an exploded perspective view of the tow hook of FIG. 1.

Referring to FIGS. 1 and 2, it is seen that the tow hook assembly 22 includes a loop 26, a bracket 28, an S-shaped retainer 30, a bolt 32 with nut 33, and a bolt 34 with nut 35.

Figure 3:
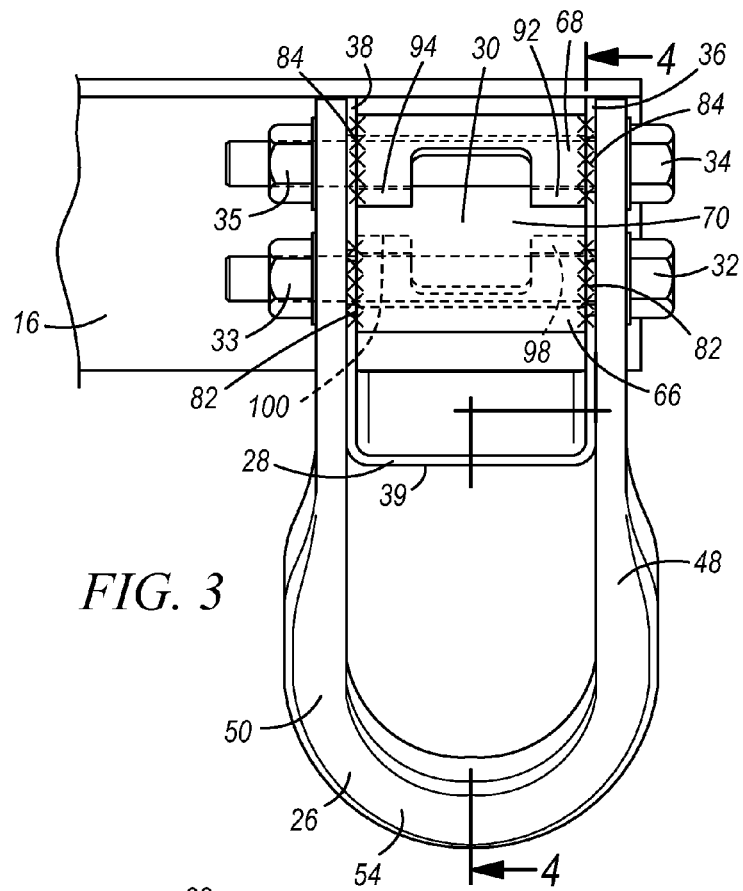
FIG. 3 is a front view of the tow hook.
Figure 4:
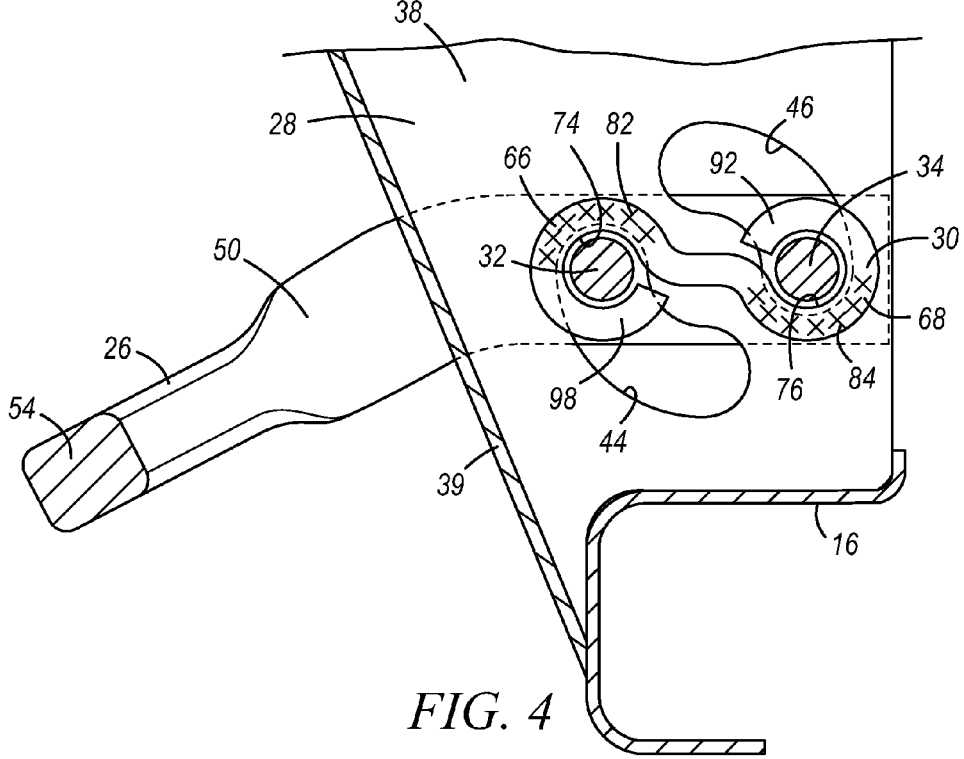
FIG. 4 is a side elevation view of the tow hook, having parts broken away and in section; and, FIG. 5 is a view similar to FIG. 4 but showing the tow hook pivoted to a collapsed position.
Figure 5:
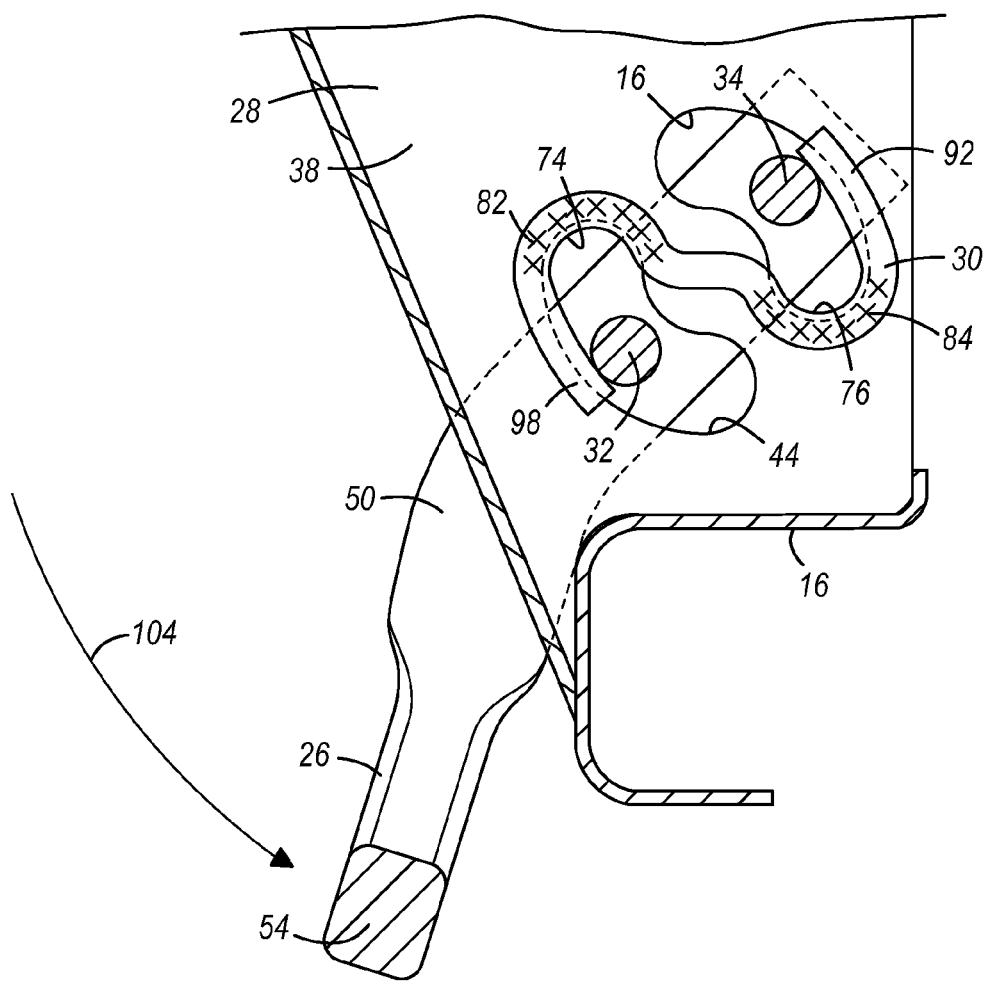

As seen in FIGS. 2-4, the bracket 28 is stamped of heavy gauge sheet material and includes spaced apart right side wall 36 and left side wall 38 that are connected by an integral front wall 39. The top of the bracket 28 is welded to the frame rail 14 and the bottom of the bracket 28 is welded to the front cross member 16. A pair of slots, including a front slot and a rear slot are provided in each of the right side wall 36 and the left side wall 38. In particular, the right side wall 36 has a front slot 40 and rear slot 42, as seen in FIG. 2. The left side wall 38 has a front slot 44 and a rear slot 46, as seen in FIGS. 4 and 5. The front slots 40 and 44 align with one another. The rear slots 42 and 46 align with one another.

The loop 26 is a U-shaped piece of bar stock that straddles the bracket 28, including a right leg 48 that lies adjacent the right side wall 36 and a left leg 50 that lies adjacent the left side wall 38. The loop 26 has a forwardmost end portion or bight 54 that extends between the legs 48 and 50 and is adapted to receive a cable or a chain of a towing vehicle or a vehicle or object being towed. The right leg 48 has a front bolt hole 56 that aligns with the front slot 40 and rear bolt hole 58 that aligns with the rear slot 42. Likewise the left leg 50 has front bolt hole 60 that aligns with front slot 44 of the left side wall 38 and rear bolt hole 62 that aligns with the rear slot 46 of the right side wall 38.

The S-shaped retainer 30 includes a front circular sleeve 66 and a rear circular sleeve 68 that are connected by a connecting web 70. The front circular sleeve 66 aligns generally with the tops 74 of the front slots 40 and 44. The rear circular sleeve 68 aligns generally with the bottoms 76 of the rear slots 42 and 46. The left and right ends of the S-shaped retainer 30 are respectively welded to the left and right side walls 36 and 38 of the bracket 28. In particular, as best seen in FIGS. 3 and 4, a plurality of spot welds 82 attach the ends of the front circular sleeve 66 to the left and right side wall 36 and 38. And a plurality of spot welds 84 attach the ends of the rear circular sleeve 68 to the left and right side walls 36 and 38.

The loop 26 is attached to the bracket 28 by inserting the bolts 32 and 34 through the bolt holes 56 and 58 and then through the slots 40 and 42, then through the circular sleeves 66 and 68, then through the slots 44 and 46, then through the bolt holes 60 and 62. The nuts 33 and 35 are installed. The bolts 32 and 34 and the S-shaped retainer 30 cooperate to establish the loop 26 at its position of FIGS. 1 and 4 and against downward rotation.

Referring again to FIGS. 2, 3 and 4 is seen that the front circular sleeves 66 and rear circular sleeves 68 each have a discontinuous wall such that the circular sleeves can spring open as seen in FIG. 5. In particular the top of the rear circular sleeve 68, as best seen in FIGS. 2 and 3, includes a right tab 92 and a left tab 94 which encircle the bolt 34. Likewise, the bottom of the front sleeve has right tab 98 and left tab that encircle the bolt 32.

As best seen in FIG. 5, the imposition of a substantial load upon the loop 26 from the forward direction will cause the loop 26 to pivot downwardly in the direction of arrow 104. The downward pivoting movement of the loop 26 is accommodated and controlled by the bolts 32 and 34 traversing the front slots 40 and 44 and the rear slots 42 and 46. As seen in FIG. 5, the travel of the bolts 32 and 34 has caused the tabs 92 and 94 of the rear sleeve 68 to bend upwardly and rearwardly as the rear bolt 34 has moved upwardly in rear slots 42 and 46 away from the bottoms 76 of the rear slots. Likewise the tabs 98 and 100 of the front circular sleeve 66 have been bent downwardly and forwardly as the front bolt 32 has moved downwardly in the front slots 40 and 42 away from the tops 74 of the front slots. Thus the tabs 98 and 100 of the front circular sleeve 66 and the tabs 92 and 94 of the rear circular sleeve 68 act as yieldable, bendable, and deformable portions of the S-shaped retainer 30 and absorb energy while permitting the travel of the bolts 32 and 34 within the path confined by the shape of the slots 40, 42, 44 and 46.

The motor vehicle 10 can be towed by connecting a cable or a chain to the loop 26 and using a tow truck or tractor to pull the loop 26 in the towing direction of arrow 106 of FIG. 1. During such towing, the load will be carried at the bolts 32 and 34 which will be engaged with the circular sleeves 66 and 68 of the S-shaped retainer 30 and/or with the side walls 36 and 38 defining the slots 40, 42, 44 and 46.

However, in the event that the motor vehicle 10 impacts a barrier, a load is imposed on the loop direction of arrow 108 of FIG. 1, thereby imposing a rotational force on the loop in the direction of arrow 104 of FIG. 5.

As best seen in FIG. 2, the loop 26 is bent somewhat at 100 and angles downwardly so that the bight 54 is at an elevation that is lower than the bolts 32 and 34. Thus, the top surface of the loop 26 constitutes an inclined plane with respect to the horizontal plane of the highway surface. Accordingly, the impact of the loop 26 with a barrier will induce the downward rotation of the loop in the direction of arrow 104.

Thus, it is seen that the tow hook can collapse downwardly out of the way so that the full impact force can be taken by the vehicle bumper and other vehicle structures which are designed to crush in controlled manner upon barrier impact. In addition, the bending of the tabs 92, 94, 98 and 100 will function to absorb energy.

Although the example shown in the drawings is of a tow hook that will pivot and collapse downwardly toward the ground, the tow hook assembly may be constructed so that the tow hook and bracket will pivot upwardly away from the ground.

Although the drawings herein show the retainer 30 as S-shaped with the front and rear circular sleeves connected by web 70, it will be understood that the web 70 can be omitted in which case the front and rear circular sleeves are separate pieces weld to the side walls of the bracket.

What is claimed is:

1. A collapsible tow hook for a motor vehicle comprising:
   a bracket attached to a vehicle structure and having laterally spaced side walls;
   a tow loop having laterally spaced arms, the spaced arms straddling the spaced side walls of the bracket;
   a first and second slots provided in each of the side walls;
   a first and second bolts extending through bolt holes in the laterally spaced arms and through the slots of the side walls, said slots permitting a pivoting of the tow loop relative the bracket as the bolts traverse the slots;
   and a retainer acting between the bracket and the first and second bolts to establish a normal upward position of the tow loop on the vehicle, said retainer allowing the first and second bolts to traverse the slots upon the imposition of a load on the tow loop in a direction opposite to the towing direction so that the tow loop is pivoted to a collapsed position relative to the vehicle structure.

2. The collapsible tow hook of claim 1 further comprising: the retainer being S-shaped and having spaced end walls respectively attached to the spaced side walls of the bracket.

3. The collapsible tow hook of claim 2 further comprising the end walls of the retainer being welded to the side walls of the bracket.

4. The collapsible tow hook of claim 1 further comprising the retainer being deformed by the imposition of a load on the tow loop to permit the first and second bolts to traverse the slot.

5. The collapsible tow hook of claim 1 further comprising: the retainer being S-shaped and having spaced end walls respectively welded to the side walls of the bracket and the retainer being deformed by the imposition of a load on the tow loop to permit the first and second bolts to traverse the slots.

6. The collapsible tow hook of claim 1 further comprising the retainer being attached to the side walls of the bracket and having a first yieldable portion engaging with the first bolt and a second yieldable portion engaging the second bolt, said first and second yieldable portions yielding to release the first and second bolt for movement within the slots upon imposition of the load on the tow hook.

7. The collapsible tow hook of claim 1 further comprising the retainer including a front circular sleeve attached to the spaced side walls of the bracket and encircling the first bolt, a second circular sleeve attached to the spaced side walls and encircling the second bolt, said first and second circular sleeves having a yieldable portion thereof that yields and deforms allowing the first and second bolts to traverse the slots.

8. The collapsible tow hook of claim 7 further comprising the first and second circular sleeves being attached together by a connecting web.

9. The collapsible tow hook of claim 7 further comprising the yieldable portions of the first and second circular sleeves including tabs that deform to allow the first and second bolts to traverse the slots.

10. The collapsible tow hook of claim 7 further comprising the first and second circular sleeves being attached together by connecting web, the first and second circular sleeve having end portions thereof welded to the sidewalls of the bracket, and each of the first and second circular sleeves having a pair of tabs that are engaged by the first and second bolts upon movement of the bolts within the slots, said tabs yielding and being deformed to permit the bolts to traverse the slots.

11. A collapsible tow hook for a motor vehicle comprising:
    a bracket attached to a vehicle structure and having laterally spaced side walls;
    a tow loop having laterally spaced arms, the spaced arms straddling the spaced side walls of the bracket and having front and rear bolt holes;
    a front slot and a rear slot provided in each of the side walls;
    a front bolt extending through the front bolt holes and the front slots and a rear bolt extending through the rear bolt holes and rear slots to mount the tow loop on the bracket;
    an S-shaped retainer attached to the bracket and having a front circular sleeve encircling the front bolt and a rear circular sleeve encircling the rear bolt to establish a normal position of the tow loop on the bracket, said front circular sleeve and rear circular sleeve being yieldable upon imposition of a load on the tow loop to allow the first and second bolts to respectively traverse the front and rear slots so that the tow loop is pivoted to a collapsed position relative to the vehicle structure.

12. The collapsible tow hook of claim 11 further comprising: the front circular sleeve and rear circular sleeve having end walls respectively attached to the spaced side walls of the bracket by welds.

13. The collapsible tow hook of claim 11 further comprising the yielding of the front circular sleeve and rear circular sleeve being provided by portions of the front circular sleeve and rear circular sleeve that respectively encircle the front bolt and rear bolt and are bent by the travel of the bolts within this front slot and rear slot of the bracket.

14. The collapsible tow hook of claim 11 further comprising the front circular sleeve and rear circular sleeve each having left and right end walls welded to the sidewalls of the bracket, and left and right tab portions encircling the front and rear bolts, and the left and right tab portions respectively yielding and bending upon movement of the front and rear bolts within the front and rear slots of the bracket upon imposition of the load on the tow hook.

15. The collapsible tow hook of claim 11 further comprising the first and second circular sleeves being attached together by a connecting web.

16. A collapsible tow hook for a motor vehicle comprising:
a bracket attached to a vehicle structure and having laterally spaced side walls;
a tow loop having laterally spaced arms, the spaced arms straddling the spaced side walls of the bracket and having front and rear bolt holes;
a front slot and a rear slot provided in each of the side walls;
a front bolt extending through the front bolt holes and the front slots and a rear bolt extending through the rear bolt holes and rear slots to mount the tow loop on the bracket;
an S-shaped retainer attached to the bracket and having a front circular sleeve aligned with a top end of the front slots and a rear circular sleeve aligned with a bottom end of the rear slots, said front and rear circular sleeves respectively encircling the front bolt and the rear bolt to establish a normal position of the tow loop on the bracket, said front circular sleeve and rear circular sleeve having yieldable portions thereof being yieldable upon imposition of a load on the tow loop allowing the first and second bolts to traverse the slots with the front bolt moving downward within the front slot and second bolt moving upward within the rear slot so that the tow loop is pivoted to a collapsed position relative to the vehicle structure.

17. The collapsible tow hook of claim 16 further comprising: the front circular sleeve and rear circular sleeve having end walls respectively attached to the spaced side walls of the bracket by welds.

18. The collapsible tow hook of claim 16 further comprising the yielding of the front circular sleeve were circular sleeve being provided by portions of the front circular sleeve and rear circular sleeve that respectively encircle the front bolt and rear bolt and are bent by downward travel the front bolt within the front slots and upward travel of the rear bolt within the rear slot of the bracket.

* * * * *